(12) United States Patent
Nishikawa et al.

(10) Patent No.: US 6,278,503 B1
(45) Date of Patent: Aug. 21, 2001

(54) VERTICAL ORIENTATION TYPE LIQUID CRYSTAL DISPLAY HAVING CONDUCTIVE FILM REDUCING THE INFLUENCE OF ELECTRICAL FIELD CAUSED BY THE STORAGE CAPACITOR LINE ON THE LIQUID CRYSTAL

(75) Inventors: Ryuji Nishikawa; Yasushi Miyajima, both of Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/484,284

(22) Filed: Jan. 18, 2000

(30) Foreign Application Priority Data

Jan. 20, 1999 (JP) .................................................. 11-012279

(51) Int. Cl.⁷ ........................ G02F 1/1343; G02F 1/1337
(52) U.S. Cl. ............................ 349/39; 389/123; 389/124; 389/130
(58) Field of Search ................ 349/36, 123, 124, 349/128, 111, 130, 38, 139

(56) References Cited

U.S. PATENT DOCUMENTS

| | | | |
|---|---|---|---|
| 5,608,556 | * | 3/1997 | Koma ................................ 349/143 |
| 5,666,179 | * | 9/1997 | Koma ................................ 349/143 |
| 5,737,051 | * | 4/1998 | Kondo et al. ..................... 349/141 |
| 5,831,704 | * | 11/1998 | Yamada et al. .................. 349/124 |
| 5,847,781 | * | 12/1998 | Ono et al. .......................... 349/44 |
| 6,081,315 | * | 6/2000 | Matsuyama et al. ............ 349/143 |
| 6,088,070 | * | 7/2000 | Ohtani et al. ..................... 349/38 |
| 6,100,947 | * | 8/2000 | Katayama ......................... 349/38 |
| 6,104,461 | * | 8/2000 | Zhang et al. .................... 349/122 |

FOREIGN PATENT DOCUMENTS 7-311383 * 11/1995 (JP) .

* cited by examiner

*Primary Examiner*—Kenneth Parker
*Assistant Examiner*—Mike Qi
(74) *Attorney, Agent, or Firm*—Hogan & Hartson, LLP (57) ABSTRACT

A vertical orientation type liquid crystal display having an orientation controlling means such as an orientation control window or an orientation control slope portion, wherein a storage capacitor electrode is disposed between a storage capacitor line extending across pixels and the liquid crystal, thereby blocking electric field generated by the storage capacitor line. This arrangement provides a liquid crystal display having a high display quality and free from orientation control disturbances due to storage capacitor lines.

16 Claims, 8 Drawing Sheets

VERTICAL ORIENTATION TYPE LIQUID CRYSTAL DISPLAY HAVING CONDUCTIVE FILM REDUCING THE INFLUENCE OF ELECTRICAL FIELD CAUSED BY THE STORAGE CAPACITOR LINE ON THE LIQUID CRYSTAL

BACKGROUND OF THE INVENTION

1. Field of the Invention

The present invention relates to a liquid crystal display (LCD), and more particularly to improvement of image display in a liquid crystal display having a storage capacitor (referred to as "SC" hereinafter).

2. Description of the Related Art

Vertical orientation type liquid crystal displays using liquid crystal with negative dielectric constant anisotropy and vertical orientation films have been developed. Devices of this type can be classified into two groups.

Figure 1A:
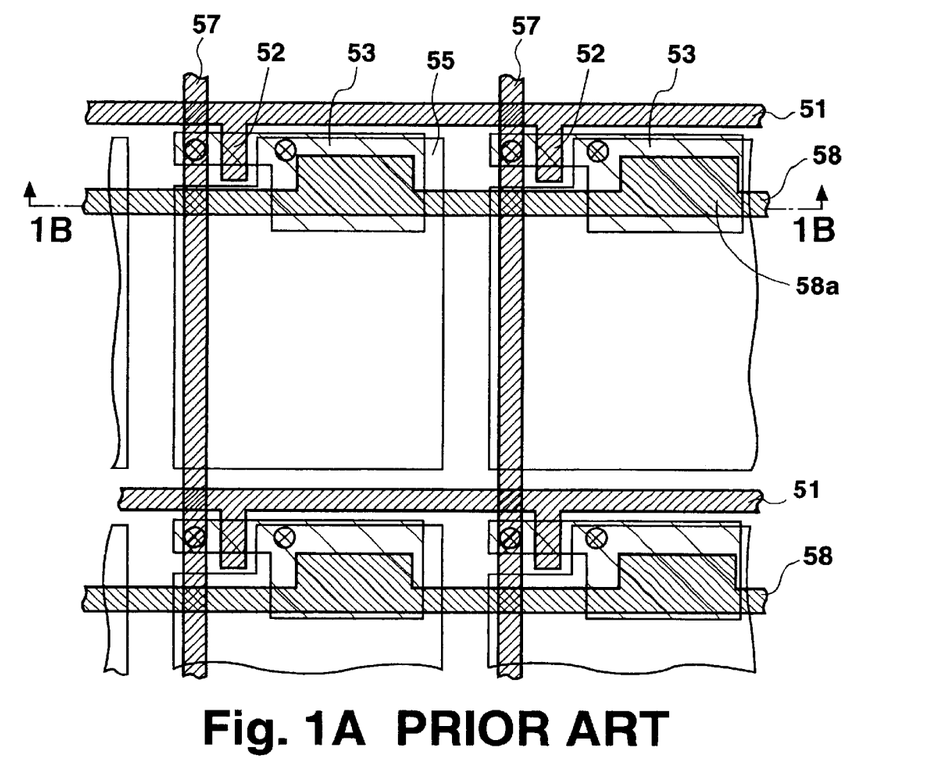
FIG. 1A is a schematic plan view of a conventional liquid crystal display.
Figure 1B:
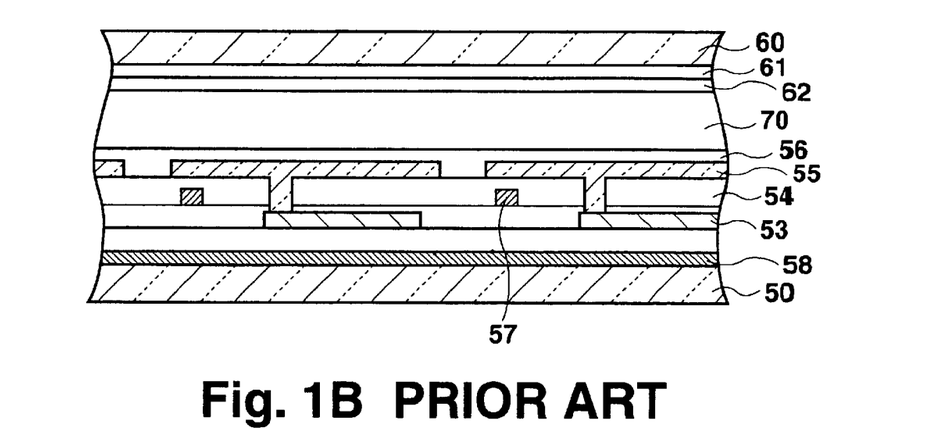
FIG. 1B is a cross-sectional view taken along line 1B—1B in FIG. 1A illustrating a schematic cross-sectional structure.

Devices in the first type use a vertical orientation film that has been treated by rubbing processing. FIG. 1A is a plan view showing an example of this type, and FIG. 1B shows a cross-sectional view taken along line 1B—1B of FIG. 1A. Gate lines 51 are formed on a first substrate 50, and a gate insulating film is formed covering the gate lines 51. Each gate line 51 includes a gate electrode 52 within a portion of a pixel. Storage capacitor electrodes (SC electrodes) 53 composed of amorphous silicon (a-Si) film are formed in discrete islands in an overlying layer so as to cross over the gate electrode 52. The SC electrode 53 is doped with impurities, and, together with the gate electrode 52, forms a thin-film transistor (TFT). These layers are covered by an interlayer insulating film 54. A pixel electrode 55 composed of ITO (indium tin oxide) is formed on the interlayer insulating film 54, and is connected to the SC electrode 53 via a contact hole opened in the interlayer insulating film 54. Although such a contact actually is not present in this cross-section, contact is shown in the cross-sectional view illustrated in FIG. 1B shows this contact to help understanding. In the next overlying layer, a vertical orientation film 56 is formed. The vertical orientation film 56 has been treated by rubbing processing. The interlayer insulating film 54 is composed of two layers, and a data line 57 is disposed in the middle of the interlayer insulating film 54. The data line 57 is connected to a source region of the TFT and supplies electric charge to the SC electrode 53 and the pixel electrode 55 when the TFT is turned on. The data line 57 is formed in a position underneath the pixel electrode 55 so as to form a vertical overlap.

On a second substrate 60 opposing the first substrate 50, a common electrode 61 composed of ITO and other materials is formed covering the plurality of pixel electrodes 55. Over the common electrode 61, a vertical orientation film 62 identical to the one disposed on the first substrate 50 is deposited and treated by rubbing processing.

Liquid crystal 70 is sealed between the first substrate 50 and the second substrate 60. The orientation of the liquid crystal molecules are controlled according to the strength of the electric field generated by a voltage applied between the pixel electrode 55 and the common electrode 61. On the outboards of the first substrate 50 and the second substrate 60, polarizing plates (not shown) are arranged such that their polarization axes are perpendicular to one another. The linearly polarized light passing between the polarizing plates is modulated while passing through the liquid crystal 70 controlled in different orientations in the respective display pixels, and is thereby controlled to a desired transmittance.

The liquid crystal 70 has negative dielectric constant anisotropy, i.e., its molecules tend to tilt towards the direction of the electric field. The vertical orientation films 56, 62 control the initial orientation of the liquid crystal in the vertical direction. Accordingly, when no voltage is applied, the liquid crystal molecules are oriented vertically with respect to the plane of the vertical orientation films 56, 62, and linearly polarized light passing one of the polarizing plates passes through the liquid crystal layer 70 but is then obstructed by the other polarizing plate, resulting in a black display. When a voltage is applied, the molecules of the liquid crystal 70 align in the rubbing axis. Consequently, the linearly polarized light that passed one of the polarizing plates is subjected to birefringence in the liquid crystal layer 70, is changed into an elliptically polarized light, and passes through the other polarizing plate. The display then approaches white. When both the gate line 51 and the data line 57 are turned on, a voltage is applied to the pixel electrode 55 via the TFT, and the liquid crystal positioned directly above the pixel electrode 55 is driven. An image is generated on the LCD by the application an independent voltage to each of the pixel electrodes 55. In other words, a region in which a pixel electrode 55 is formed is defined as a pixel.

A light-blocking black matrix (not shown) is formed in regions other than pixels, i.e., gaps between the pixel electrodes 55 and the regions constituting the TFT including the SC electrodes 53. The black matrix is disposed to prevent white inter-pixel regions from reducing contrast. When light transmitted through one of the polarizing plates and coming into the liquid crystal layer is subjected to birefringence when passing through the pre-tilted crystal, the black matrix prevents undesired light from irradiating through the other polarizing plate in the inter-pixel regions where no voltage is applied.

Figure 2:
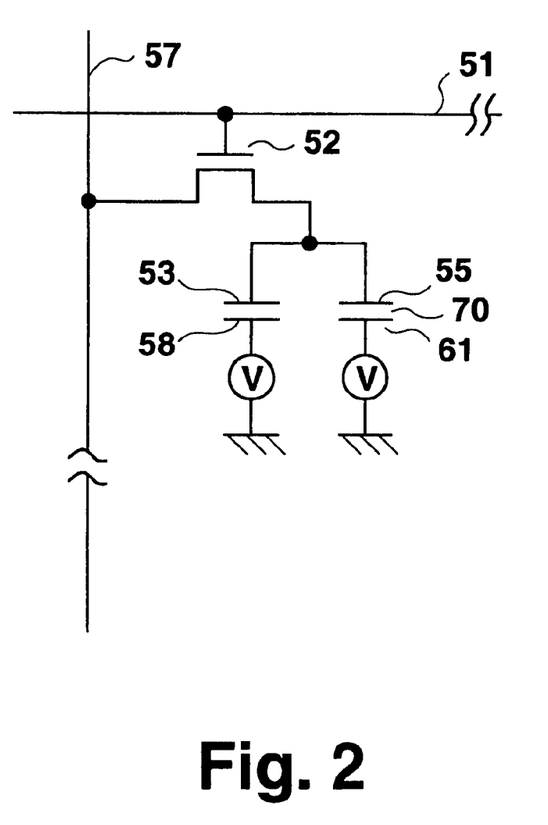
FIG. 2 shows an equivalent circuit of a typical liquid crystal display.

The function of the SC electrode 53 is next explained. In the LCD, a voltage is applied between the pixel electrode 55 and the common electrode 61, and transmittance is controlled by orienting the liquid crystal using the electric field generated by the applied voltage, as described above. However, as liquid crystal is not an absolute insulator, a slight current flows when the voltage is applied to the pixel electrode. Consequently, the electric charge stored in the pixel electrode 55 becomes discharged, and the voltage between the pixel electrode 55 and the common electrode 61 cannot be maintained. To solve this problem, a storage capacitor (SC) line 58 made of chromium or similar material is disposed to form a storage capacitor together with the SC electrodes 53 in the portions overlapping the SC electrodes 53, thereby supplying electric charges to the pixel electrode 55. The SC line 58 is formed to have a large width at the portion 58a opposing the SC electrode 53 to provide a large capacitance together with the SC electrode 53. FIG. 2 shows an equivalent circuit including a pixel, a storage capacitor, a data line, and a gate line. The capacitor constituted by the liquid crystal 70 interposed between the pixel electrode 55 and the common electrode 61, and the storage capacitor constituted by the SC electrode 53 and the SC line 58, are connected to the data line 57 via the TFT including the gate electrode 52.

Figure 3A:
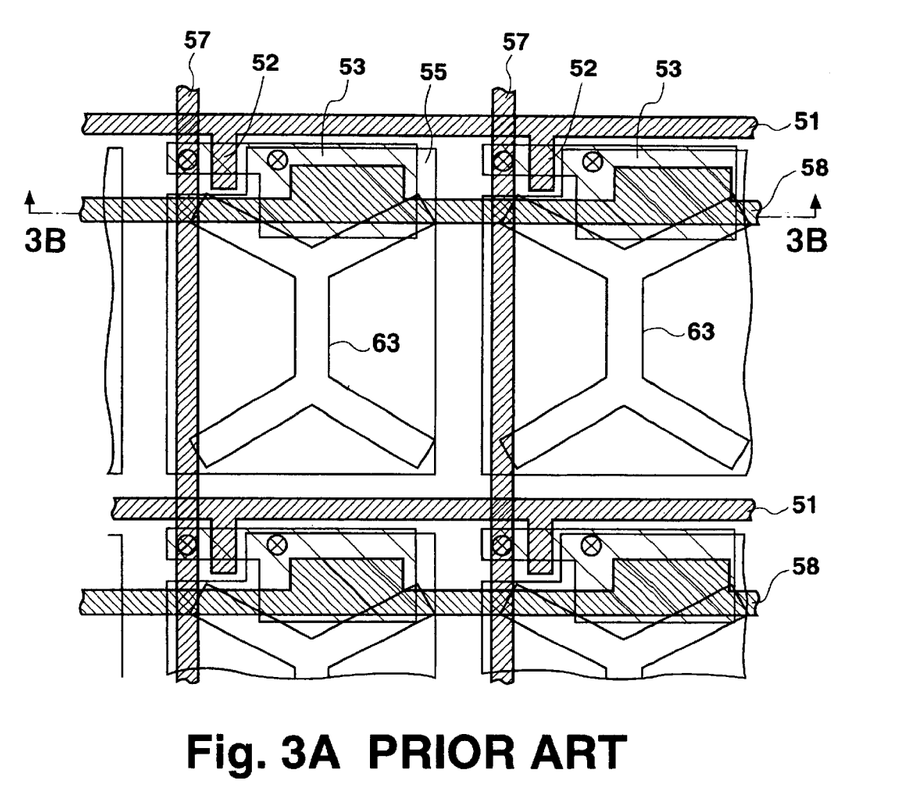
FIG. 3A is a schematic plan view of a conventional liquid crystal display different from FIG. 1A.
Figure 3B:
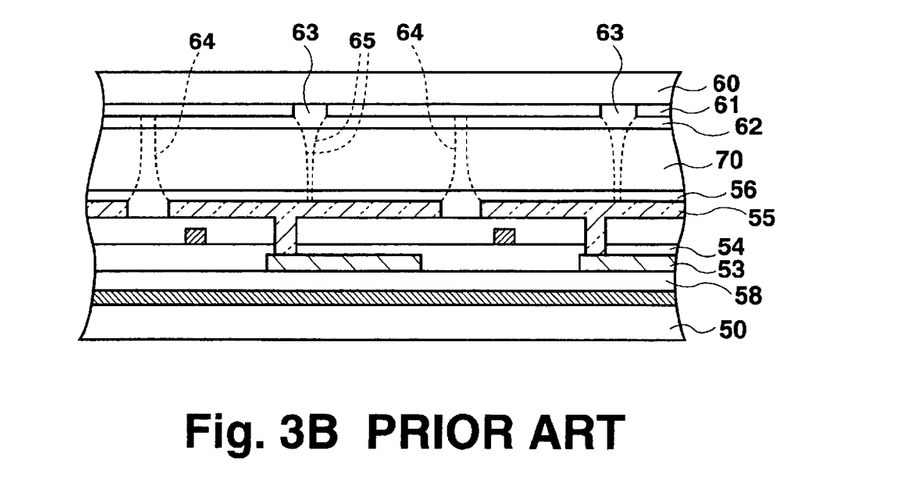
FIG. 3B is a cross-sectional view taken along line 3B—3B in FIG. 3A illustrating a schematic cross-sectional structure.

In the second type of vertical orientation type LCD, the vertical orientation film is not treated by rubbing processing. Instead, the vertical orientation type LCD of the second type comprises a separate orientation control means for controlling the liquid crystal orientation. A vertical orientation type LCD having orientation control windows for controlling orientation is proposed in the commonly assigned Japanese Patent Application No. H05-84696 (JPA H06-301036), for example. FIG. 3A is a plan view illustrating an LCD having orientation control windows, and FIG. 3B is a cross-sectional view taken along line 3B—3B of FIG. 3A. The LCD of FIGS. 3A and 3B coincides with the LCD of FIGS. 1A and 1B in that an SC electrode 53 forming a TFT and a pixel electrode 55 connected to the SC electrode are provided on a first substrate 50 which together with a substrate 60 seals liquid crystal 70, and that polarizing layers are disposed on the outboard. Structures of FIGS. 3A and 3B that correspond to structures of the LCD of FIGS. 1A and 1B are labeled with corresponding reference numerals and their explanations will not be repeated. The LCD of FIGS. 3A and 3B greatly differs from the LCD of FIGS. 1A and 1B in that openings are made in the common electrode 61 to form orientation control windows 63, and that the vertical orientation films 56, 62 are not treated with rubbing processing. An orientation control window 63 is a region where no electrode is present, and is shown in the example in the shape of two "Y's" connected at their bottoms.

In this arrangement, a voltage is applied between the pixel electrode 55 and the common electrode 61 to create electric fields 64, 65 which tilt the liquid crystal molecules 70. At an end portion of the pixel electrode 55, the electric field 64 slants from the pixel electrode 55 towards the common electrode 61. Similarly due to the absence of electrode, the electric field 65 slants towards the pixel electrode 55 at an edge of an orientation control window 63. The orientation of the liquid crystal is controlled by these slanted electric fields. The liquid crystal molecules therefore towards the orientation control window 63 regardless of their pre-tilt angle.

Due to the absence of common electrode 61 in a region directly beneath the orientation control window 63, no electric field is created even during the voltage application between the electrodes. The liquid crystal molecules in this region are therefore fixed in the initially oriented state, i.e., the vertical direction. Accordingly, regions of the liquid crystal on the respective sides of the orientation control window 63 can be oriented in opposing directions via the continuous property of liquid crystal, resulting in a broader viewing angle than in the LCD of FIGS. 1A and 1B.

(Additional Art)

A black matrix is not absolutely necessary in a vertical orientation type LCD without rubbing processing because such LCD adopts the "normally black scheme" wherein black is displayed when no voltage is applied. Eliminating a black matrix is disclosed in, for example, Japanese Patent Application No. H09-317169, which was filed by the present applicant and does not constitute prior art for the present invention.

Figure 4A:
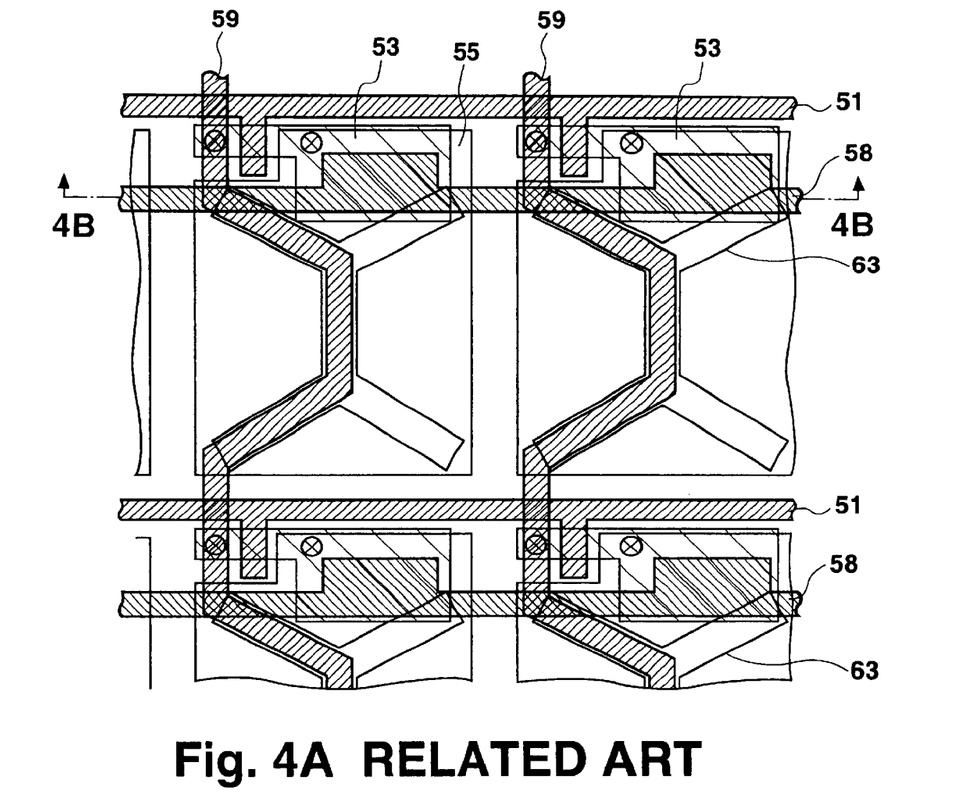
FIG. 4A is a schematic plan view of a liquid crystal display related to that of the present invention.
Figure 4B:
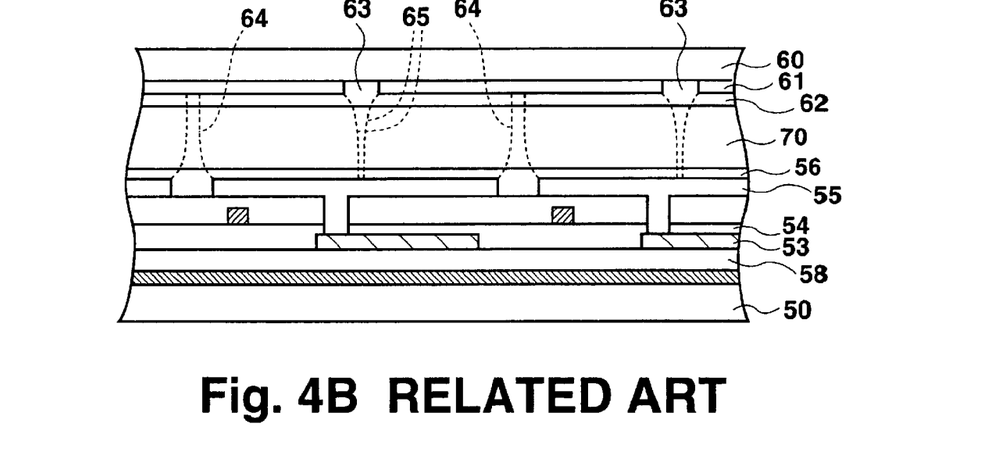
FIG. 4B is a cross-sectional view taken along line 4B—4B in FIG. 4A illustrating a schematic cross-sectional structure.

FIGS. 4A and 4B illustrate another example of an LCD of the second type. In this example, the data line 59 is formed overlapping the orientation control window 63. Light transmitting through the data line 59 attenuates by a fixed ratio. In addition, the liquid crystal beneath the orientation control window 63 does not allow light to pass through even when voltage is applied because the initial orientation is maintained. Light transmittance is reduced in these regions, resulting in a large decrease of light transmittance in the overall pixel. To alleviate this problem and minimize any decrease in light transmittance, these regions are formed so as to overlap. Details concerning this point are described in Japanese Patent Application No. H10-337840, which was filed by the present applicant and does not constitute a prior art for the present invention.

As described above, a storage capacitor (SC) line is provided under the SC electrode 53. The SC line is applied with a voltage so as to supply electric charges to the pixel electrode 55.

However, in such an arrangement, the voltage applied to the SC line leaks between adjacent pixels into the liquid crystal layer, thereby allowing light to pass through the liquid crystal located between the pixels. In the above-mentioned vertical orientation type LCD without black matrix, no structure is provided to block the inter-pixel transmitting light. Deterioration in display quality, such as decreased contrast, may therefore result, especially when displaying the color black.

Further, as the liquid crystal molecules driven in inter-pixel locations are not under orientation control, their orientation directions are diverse, differing in individual cells and after each application of voltage. In an LCD wherein rubbing processing is not performed on the vertical orientation films 56, 62, the control over liquid crystal orientation is relatively weak. The orientation of the liquid crystal located within a pixel and driven by a voltage in the pixel electrode is therefore disturbed by the inter-pixel liquid crystal due to the continuous property of liquid crystal, resulting in deterioration of display quality.

SUMMARY OF THE INVENTION

In light of the above-described problems, the object of the present invention is to provide a structure for an LCD with high display quality with no inter-pixel light leakage even when composed as a vertical orientation type LCD without a black matrix or without rubbing processing performed on the vertical orientation films or without either.

According to the present invention conceived for accomplishing the above object, there is provided a liquid crystal display configured by sealing liquid crystal with negative dielectric constant anisotropy between first and second substrates each having electrodes disposed on the sides facing one another, wherein the first substrate comprises a plurality of pixel electrodes for driving said liquid crystal, spaced apart from one another in a matrix arrangement; storage capacitor electrodes each of which is electrically connected to a respective pixel electrode; a storage capacitor line extending across pixel electrodes defining one row among said plurality of pixel electrodes, said storage capacitor line arranged opposing said storage capacitor electrodes and forming a storage capacitor together with said storage capacitor electrodes; a first vertical orientation control film for controlling orientation of said liquid crystal, said control film covering said plurality of pixel electrodes; and a conductive film disposed at least in a gap region between the pixel electrodes defining said one row, said conductive film formed between said storage capacitor line and said liquid crystal and insulated from said storage capacitor line.

By providing a conductive film insulated from a storage capacitor line and disposed between an inter-pixel portion of the storage capacitor line and the liquid crystal, electromagnetic fields generated by the storage capacitor line are shielded using the conductive film and prevented from reaching the liquid crystal in the present invention. Driving of the inter-pixel liquid crystal is thereby prevented, eliminating bright spots in inter-pixel regions and unfavorable influence of the orientation of the liquid crystal within the pixels. In this way, a vertical orientation type liquid crystal display with high display quality is realized.

According to another aspect of the present invention, the electric potential of the conductive film in the liquid crystal display may be set at an identical to that of a corresponding electrode among said plurality of pixel electrodes.

By shielding the storage capacitor line located in the gaps between adjacent pixel electrodes with a conductive film having an identical potential with a corresponding pixel electrode, an effect equivalent to that achieved by covering the storage capacitor line with the pixel electrode can substantially be accomplished. Disturbances in the liquid crystal orientation can thereby be reliably prevented in the gap regions between pixel electrodes.

According to a further aspect of the present invention, the conductive film in the liquid crystal display may be composed of said storage capacitor electrode extending in a region between the corresponding pixel electrode region and an adjacent pixel electrode region.

When the conductive film is a portion of the storage capacitor electrode, shielding of electromagnetic fields can be made more reliable. In addition, the storage capacitor can be made larger because the storage capacitor line and storage capacitor electrode located between pixels can also function as a portion of the storage capacitor.

According to a still further aspect of the present invention, the conductive film of the liquid crystal display may extend from the corresponding pixel electrode region to an adjacent pixel electrode region. Such a conductive film may be composed of, for example, the storage capacitor electrode.

With this arrangement, the storage capacitor line is prevented from directly facing the liquid crystal because a portion of the storage capacitor electrode covering the storage capacitor line extends to reach the pixel electrode region adjacent to the corresponding pixel electrode to which the storage capacitor electrode is connected. In this way, a more reliable shielding of electric field can be achieved.

According to another aspect of the present invention, the liquid crystal display comprises a data line for supplying display data to the pixel electrodes defining one row among said plurality of pixel electrodes, and the conductive film extends from the corresponding pixel electrode region to an adjacent pixel electrode region up to very near (i.e. just before reaching) the data line supplying the display data to the adjacent pixel electrode region. This conductive film may be composed of, for example, the storage capacitor electrode.

With this arrangement, short-circuiting between the storage capacitor electrode and the data line can be prevented because the portion of the storage capacitor electrode covering the storage capacitor line does not overlap the data line.

In a further aspect of the present invention, the liquid crystal display comprises thin-film transistors formed corresponding to each of the plurality of pixel electrodes, and a layer in which the active layer of the thin-film transistors is formed serves as the storage capacitor electrode.

In a still further different aspect of the present invention, the liquid crystal display comprises thin-film transistors formed corresponding to each of the plurality of pixel electrodes, and the layer in which the active layer of the thin-film transistors is formed serves as the storage capacitor electrode and the conductive film.

When a thin-film transistor is provided for each pixel, the layer having the active layer which comprises a source region and a drain region and which may also comprise a channel region may be serve as the storage capacitor electrode and the conductive film. The storage capacitor electrode and the conductive film can therefore be formed without performing additional manufacturing steps and can be provided simultaneously with the formation of the thin-film transistor. The active layer of a thin-film transistor, especially the source and the drain regions, sufficiently function as the storage capacitor electrode and the conductive film because those regions usually have a high concentration of impurities and are very conductive.

In another aspect of the liquid crystal display according to the present invention, the counter electrodes disposed on the second substrate have openings created therein forming orientation control windows in positions corresponding to each of the plurality of pixel electrodes.

In a further aspect of the liquid crystal display according to the present invention, the second substrate comprises a second vertical orientation control film formed covering the counter electrodes, and the surface of the second vertical orientation control film contacting the liquid crystal and/or the surface of the first vertical orientation control film contacting the liquid crystal are provided with orientation control slope portions. The orientation control slope portions tilt from the plane of the first or the second substrate.

In the present invention, the orientation control slope portions may be shaped by forming a bump and/or a concavity in the contacting surface of the vertical orientation control film with the liquid crystal.

By providing the orientation control windows or the orientation control slope portions as the orientation controllers, the orientation of the liquid crystal in each pixel region can be reliably controlled. Even when a vertical orientation film of the type wherein no rubbing processing has been performed is used on either or both of the first and second substrates, the orientation controller ensures the reliability of orientation control. This facilitates, for example, a liquid crystal display with a high opening ratio and high precision while avoiding damages to the TFT as is sometimes caused by rubbing processing. In addition, by disposing the orientation controllers to provide sections of different liquid crystal orientation directions within each pixel region, the viewing angle of the LCD can be broadened, thereby realizing an even higher quality liquid crystal display.

DESCRIPTION OF THE PREFERRED EMBODIMENTS

Figure 5A:
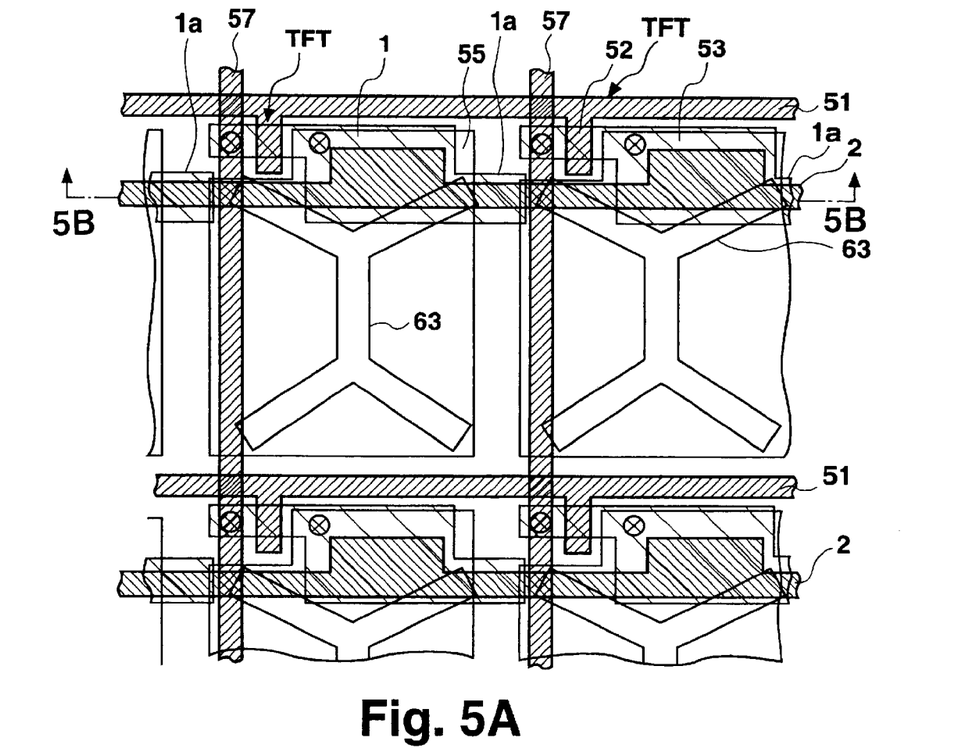
FIG. 5A is a schematic plan view of a liquid crystal display according to an embodiment of the present invention.
Figure 5B:
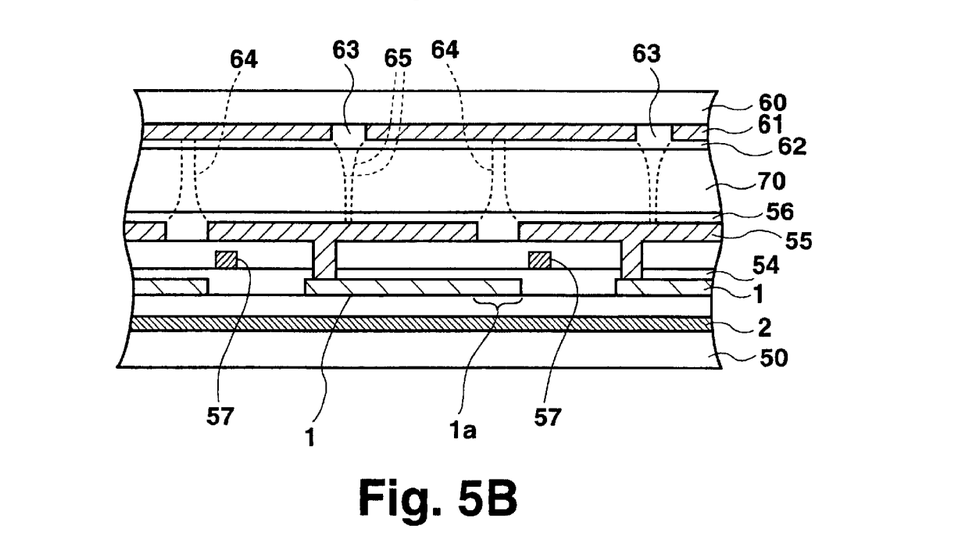
FIG. 5B is a cross-sectional view taken along line 5B—5B in FIG. 5A illustrating a schematic cross-sectional structure.

FIG. 5A is a plan view of a first embodiment of the present invention, and FIG. 5B is a cross-sectional view taken along line 5B—5B in FIG. 5A. The same reference numerals are used in these Figures as in the above-described LCD to indicate the corresponding structures, and the explanations for those structures will not be repeated. Although no contacting regions actually exist along line 5B—5B of FIG. 5A, in FIG. 5B contact holes connecting pixel electrodes 55 and the active layer 1b of TFT are shown to help understanding. A gate line 51 is formed on a first substrate 50. A TFT is constituted by a gate electrode 52 itself composed of a portion of the gate line 51 and a SC electrode 1 also serving as the active layer 1b. A two-layered interlayer insulating film 54 is formed on the TFT, and a pixel electrode 55 is formed on top of this film. The pixel electrode 55 connects via a contact hole to the SC electrode 1 also functioning as the TFT active layer 1b. A vertical orientation film 56 composed of a material such as polyimide is formed covering the pixel electrode 55. A data line 57 for supplying a voltage in accordance with display data to each pixel electrode 55 via the TFT is formed between the layers of the interlayer insulating film 54. Provided on a second substrate 60 arranged opposing the first substrate 50 are a common electrode (counter electrode) 61 and a vertical orientation film that has not been treated by rubbing processing. An orientation control window 63 for controlling the orientation of liquid crystal is formed in the common electrode 61. Liquid crystal 70 with negative dielectric constant anisotropy is filled between these first and second substrates 50,60. The orientation of the liquid crystal 70 is controlled by the magnitude of electric field generated by a voltage applied between the pixel electrode 55 and the common electrode 61.

As illustrated in FIG. 5B, a SC line 2 composed of a material such as chromium is formed beneath the pixel electrode 55 with the SC electrode 1 lying in between. The SC line 2 forms a storage capacitor together with the SC electrode 1 for each one of the pixels to supply electric charge to the pixel electrodes 55.

This configuration significantly differs from conventional LCDs in that the SC electrode 1 includes an extended portion 1a that covers the SC line 2 lying between the pixels.

The extended portion 1a of the SC electrode 1 extends up to the edge of the pixel electrode 55 of the adjacent pixel so as to cover the section of the SC line 2 lying across the gap between pixels, whereas, in a conventional LCD, such a section of the SC line 2 is electrically exposed to the liquid crystal in the inter-pixel gap. The extended portion 1a can be of any desired width that covers the SC line 2, but should be formed wider than the SC line 2 so as to cover with margins. It is noted that this extended portion 1a is formed such that it does not short-circuit with the SC electrode 1 of the adjacent pixel. By patterning the SC electrodes 1 to include such extended portions 1a, the SC line 2 is prevented from directly contacting the liquid crystal 70 in the gaps between the pixel electrodes 55. Accordingly, in the gaps between the pixel electrodes 55, electric field generated by the SC line 2 is blocked by the extended portion 1a of the SC electrode 1. The tilt of the inter-pixel liquid crystal is therefore not influenced. Moreover, the storage capacitance can also be made larger because the area of overlap between the SC electrode 1 and the SC line 2 increases by the extension of the SC electrode 1 to inter-pixel regions.

If a SC electrode and a data line 57 inadvertently short circuit, that pixel becomes a deficient pixel. The extended portion 1a of the SC electrode should therefore not extend to a position directly underneath the data line 57. Accordingly, in the structure shown in FIG. 5B, the extended portion 1a of the SC electrode 1 extends from the corresponding pixel electrode region and terminates just before reaching the data line 57 in the adjacent pixel electrode region.

Figure 6A:
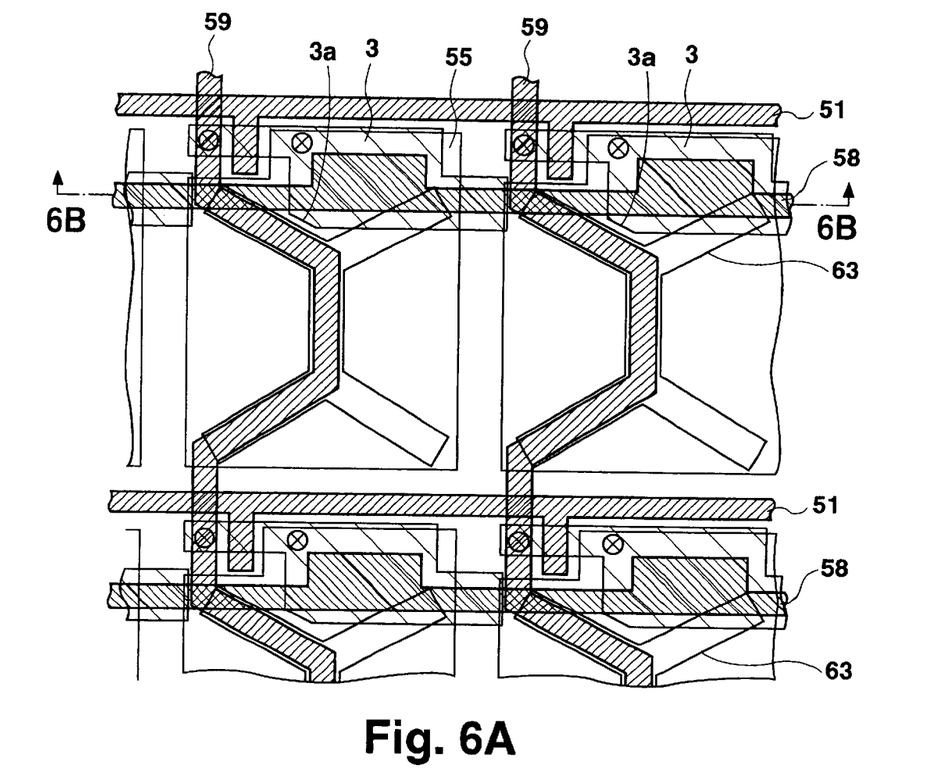
FIG. 6A is a schematic plan view of a liquid crystal display according to an her embodiment of the present invention.
Figure 6B:
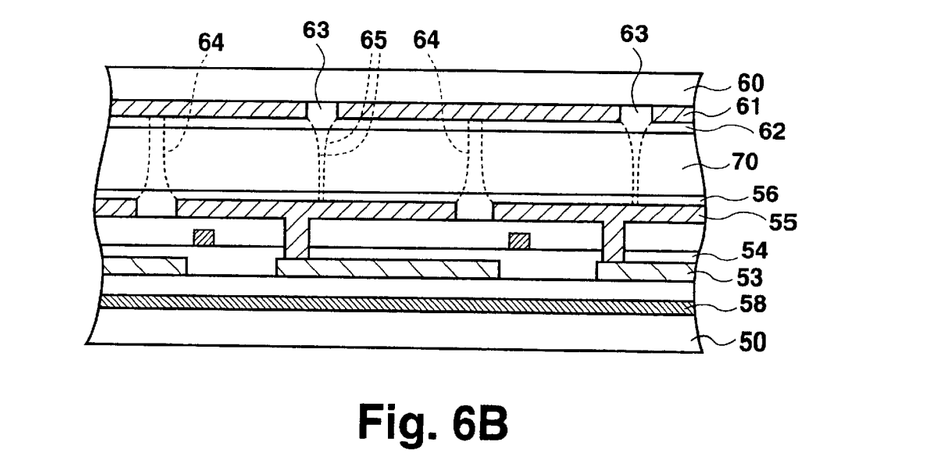
FIG. 6B is a cross-sectional view taken along line 6B—6B in FIG. 6A illustrating a schematic cross-sectional structure.

FIGS. 6A and 6B illustrate a second embodiment of the present invention. This embodiment is an example wherein the data lines 59 are disposed along the orientation control windows 63. While the SC electrode 3 of this embodiment is generally identical with the SC electrode 1 of the first embodiment, the SC electrode 3 includes a cut-off portion 3a along the bend of the data line 59 so as to avoid overlapping the data line 59.

Figure 7A:
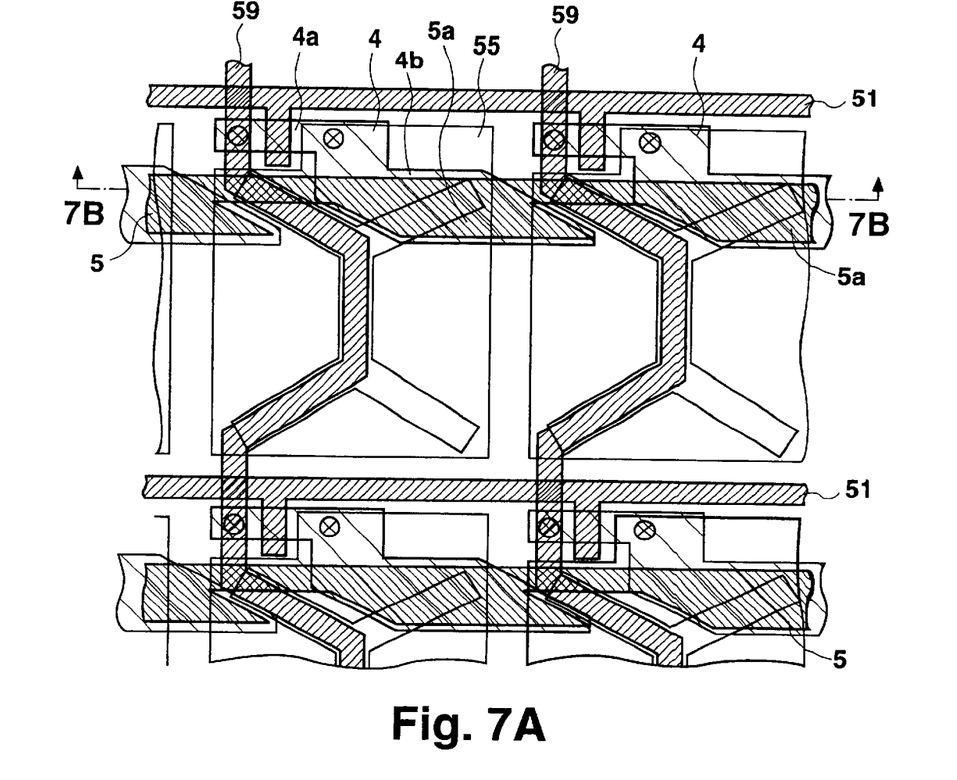
FIG. 7A is a schematic plan view of a liquid crystal display according to yet another embodiment of the present invention.
Figure 7B:
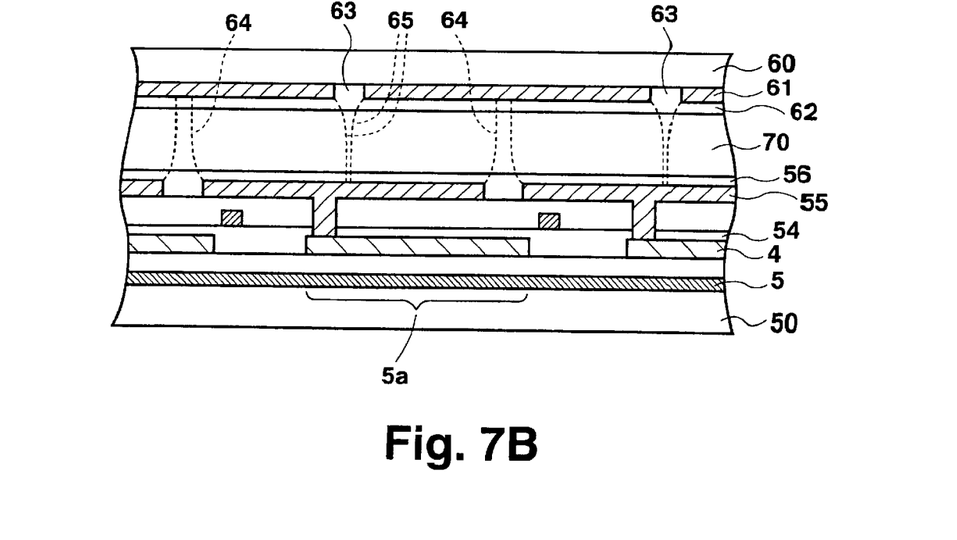
FIG. 7B is a cross-sectional view taken along line 7B—7B in FIG. 7A illustrating a schematic cross-sectional structure.

FIGS. 7A and 7B illustrate a third embodiment of the present invention. This embodiment is an example wherein the data lines 59 are disposed along the orientation control windows 63. The SC electrode 4 of the present embodiment comprises a region 4a constituting the TFT and a region 4b constituting the storage capacitor. One side of the region 4b constituting the storage capacitor is formed substantially parallel to the portion of the data line 59 that curves from the upper left corner of the pixel toward the center of the pixel in FIG. 7A. In other words, the region 4b is formed along the direction in which the data line 59 extends. The SC line 5 possesses a region 5a which extends to the adjacent pixel and constitutes the storage capacitor. Accordingly, the storage capacitor constituted by the SC electrode 4 and the SC line 5 is disposed extending in the adjacent pixel. A sufficient area can therefore be provided for the storage capacitor, enlarging storage capacitance.

In conventional devices, the width of the SC line 58 in the inter-pixel region must be made as narrow as possible in order to reduce the unfavorable effects of the SC line 58. However, as the SC line 5 of the present embodiment is blocked by the SC electrode 4 that electrically connects to the pixel electrode 55, electric field from the SC line 5a does not leak to the liquid crystal 70 and no unfavorable effects result in the orientation of the liquid crystal 70 even if the SC line 58 in the inter-pixel region is formed wide. According to this arrangement, a storage capacitor extending in inter-pixel regions can be formed.

Figure 8A:
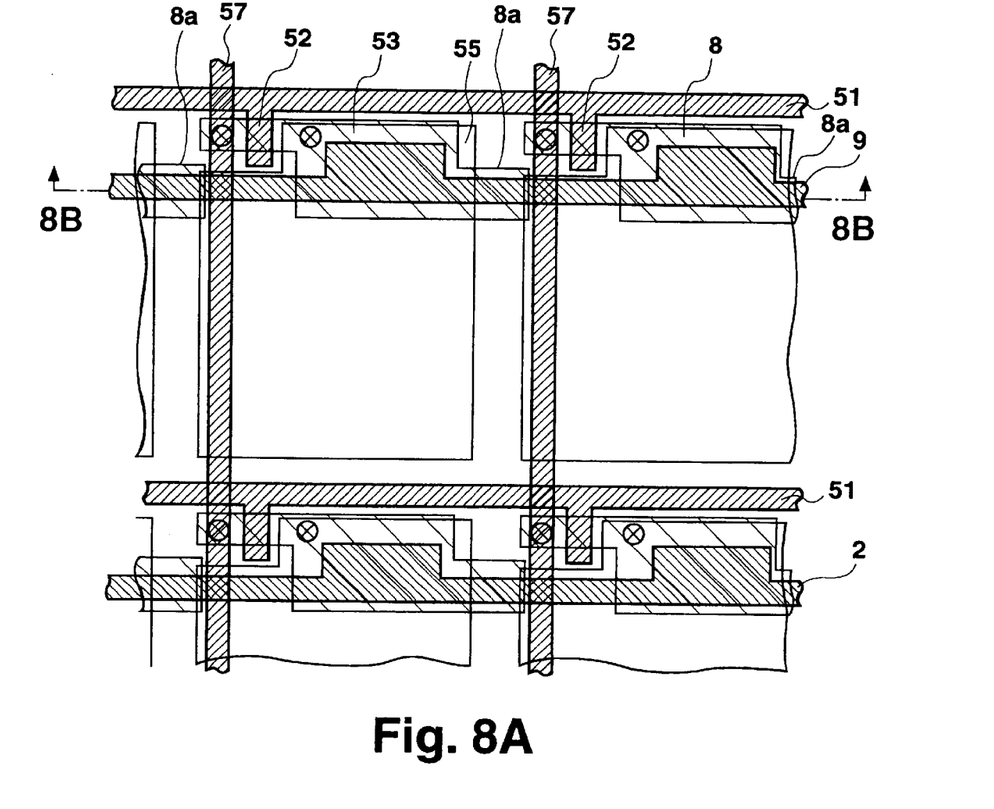
FIG. 8A is a schematic plan view of a liquid crystal display according to another embodiment of the present invention.
Figure 8B:
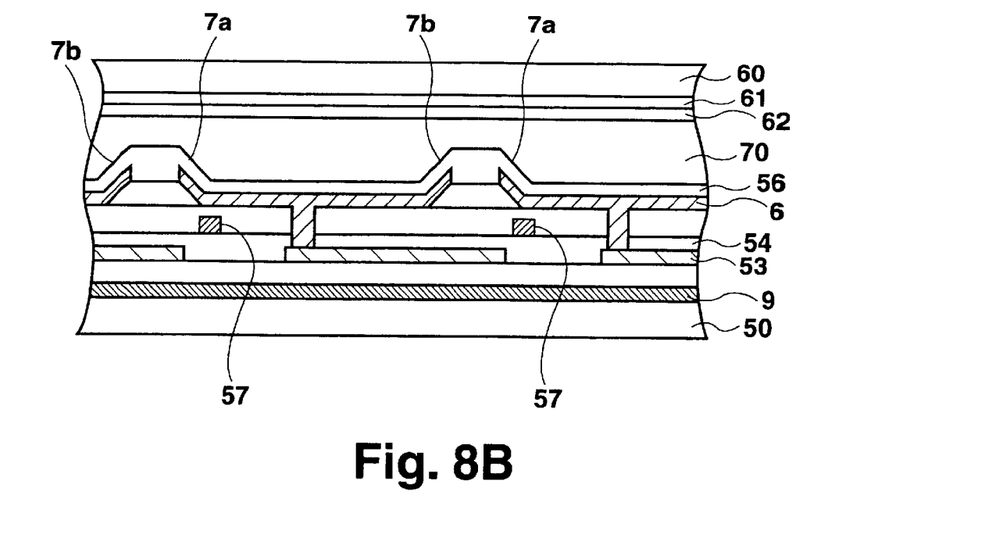
FIG. 8B is a cross-sectional view taken along line 8B—8B in FIG. 8A illustrating a schematic cross-sectional structure.

FIGS. 8A and 8B illustrate an example application of the present invention to an LCD having an orientation control slope portion. FIG. 8A shows a plan view, while FIG. 8B shows a cross-sectional view taken along line 8B—8B in FIG. 8A. The same reference numerals are used in these Figures as in the above-described conventional LCD to indicate the corresponding structures, and the explanations for those structures will not be repeated. This example differs from the above description in that the end portions of the pixel electrodes 6 protrude upward, and that orientation control slope portions 7a, 7b are formed in the orientation control film covering those end portions. The orientation control slope portion 7a tilts the initial orientation of the liquid crystal molecules towards the right in the figure, while the orientation control slope portion 7b tilts the initial orientation of the liquid crystal molecules toward the left in the figure. The orientation of the liquid crystal molecules in the center of the pixel is also controlled during application of a voltage by the effect conveyed from the liquid crystal molecules surrounding the slope portions via the continuous property of liquid crystal. As with the first embodiment, the present example provides a vertical orientation type LCD having orienting films without rubbing processing wherein the SC electrode 8 covers the SC line 9 extending across the gap between the pixels. This scheme for controlling liquid crystal orientation using the slope portions 7a, 7b rather than of the above-described orientation control windows is proposed by the present applicant in JPA H07-311383.

By forming SC electrodes to cover SC lines extending between pixels in a vertical orientation type LCD having vertical orientation films without rubbing processing as described above, liquid crystal is prevented from being inadvertently driven by an electromagnetic field leaking from the SC line 9, and disturbances in the orientation of liquid crystal caused by such leaks can be eliminated. Although the above embodiments were illustrated with using orientation control windows or orientation control slope portions as examples of structures for orientation control, the present invention is not limited to devices employing such structures. The present invention may be implemented in a vertical orientation type LCD having vertical orientation films without rubbing processing regardless of type of orientation controlling scheme employed.

What is claimed is:

1. A liquid crystal display constituted by sealing liquid crystal with negative dielectric constant anisotropy between first and second substrates, each of the substrate having electrodes disposed on sides facing one another, wherein the first substrate comprises:

a plurality of pixel electrodes for driving said liquid crystal, spaced apart from one another in a matrix arrangement;

storage capacitor electrodes each of which is electrically connected to one of the plurality of pixel electrodes;

a storage capacitor line extending across pixel electrodes defining one row among said plurality of pixel electrodes, said storage capacitor line arranged opposing said storage capacitor electrodes and forming a storage capacitor together with said storage capacitor electrodes;

a first vertical orientation control film for controlling orientation of said liquid crystal, said control film covering said plurality of pixel electrodes; and a conductive film disposed at least in a gap region between the pixel electrodes defining said one row, said conductive film formed between said storage capacitor line and said liquid crystal and insulated from said storage capacitor line, and said conductive film reducing the influence of electrical field caused by said storage capacitor line on said liquid crystal.

2. The liquid crystal display defined in claim 1 wherein a counter electrode disposed on the second substrate has openings created therein forming orientation control windows in positions corresponding to each of the plurality of pixel electrodes.

3. The liquid crystal display defined in claim 1 wherein:

the second substrate comprises a second vertical orientation control film formed covering a counter electrode; and a surface of the second vertical orientation control film contacting the liquid crystal and/or a surface of the first vertical orientation control film contacting the liquid crystal are provided with an orientation control slope portion that tilts from a plane of the first or the second substrate.

4. The liquid crystal display defined in claim 3 wherein the orientation control slope portion is shaped by forming a bump and/or a concavity in the surface of the vertical orientation control film contacting the liquid crystal.

5. The liquid crystal display defined in claim 1 wherein an electric potential of said conductive film is set identical to that of a corresponding electrode among said plurality of pixel electrodes.

6. The liquid crystal display defined in claim 1 wherein said conductive film is composed of said storage capacitor electrode extending in a region between a corresponding pixel electrode region and an adjacent pixel electrode region.

7. The liquid crystal display defined in claim 6 wherein a counter electrode disposed on the second substrate has openings created therein forming orientation control windows in positions corresponding to each of the plurality of pixel electrodes.

8. The liquid crystal display defined in claim 6 wherein:

the second substrate comprises a second vertical orientation control film formed covering a counter electrode; and a surface of the second vertical orientation control film contacting the liquid crystal and/or a surface of the first vertical orientation control film contacting the liquid crystal are provided with an orientation control slope portion that tilts from a plane of the first or the second substrate.

9. The liquid crystal display defined in claim 8 wherein the orientation control slope portion is shaped by forming a bump and/or a concavity in the surface of the vertical orientation control film contacting the liquid crystal.

10. The liquid crystal display defined in claim 1 wherein said conductive film extends from a corresponding pixel electrode region reaching an adjacent pixel electrode region.

11. The liquid crystal display defined in claim 10 wherein said conductive film is composed of said storage capacitor electrode.

12. The liquid crystal display defined in claim 1 further comprising:

a data line for supplying display data to the pixel electrodes defining one row among said plurality of pixel electrodes; wherein said conductive film extends from a corresponding pixel electrode region to an adjacent pixel electrode region up to very near the data line supplying the display data to the adjacent pixel electrode region.

13. The liquid crystal display defined in claim 12 wherein said conductive film is composed of said storage capacitor electrode.

14. The liquid crystal display defined in claim 1 further comprising:

thin-film transistors formed corresponding to each of the plurality of pixel electrodes; wherein a layer in which an active layer of the thin-film transistors is formed serves as said storage capacitor electrode.

15. The liquid crystal display defined in claim 1 further comprising:

thin-film transistors formed corresponding to each of the plurality of pixel electrodes; wherein a layer in which an active layer of the thin-film transistors is formed serves as said storage capacitor electrode and said conductive film.

16. The liquid crystal display defined in claim 15 wherein said conductive film extends in a region between a corresponding pixel electrode region and an adjacent pixel electrode region.

* * * * *